Oct. 29, 1929.  B. LAUKAMP  1,733,739
MOLD FOR MANUFACTURING HAIR CLAMPS
Filed Sept. 8, 1927  2 Sheets-Sheet 1
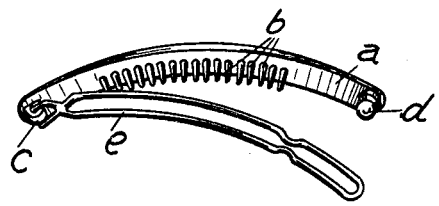
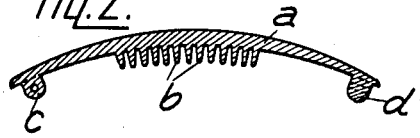
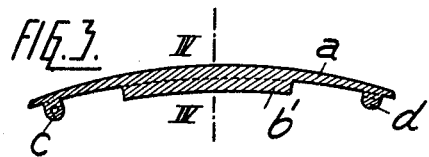

Oct. 29, 1929. B. LAUKAMP 1,733,739
MOLD FOR MANUFACTURING HAIR CLAMPS
Filed Sept. 8, 1927 2 Sheets-Sheet 2
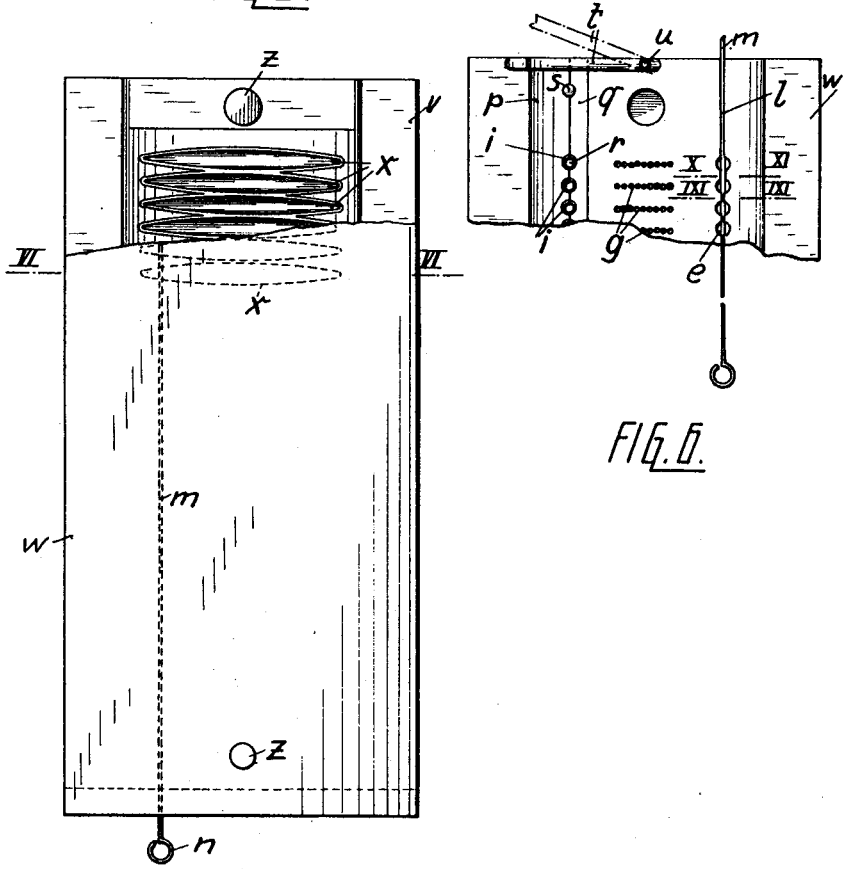
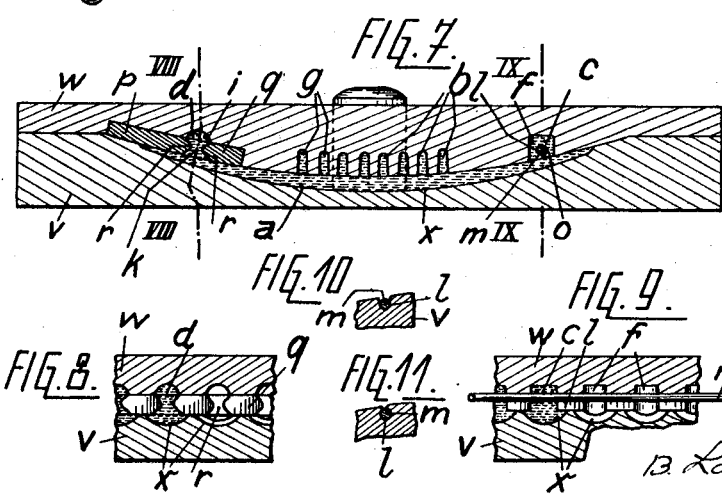

Patented Oct. 29, 1929

1,733,739

UNITED STATES PATENT OFFICE

BERNHARD LAUKAMP, OF BERLIN-PANKOW, GERMANY

MOLD FOR MANUFACTURING HAIR CLAMPS

Application filed September 8, 1927, Serial No. 218,321, and in Germany July 13, 1926.

My invention relates to hair clamps and to molds for manufacturing same, and it is an object of my invention to provide an improved appliance of this kind, and an improved mold.

To this end, instead of manufacturing the projections, teeth or pins, ribs, eyes, studs, etc., with which the body of such clamps is usually provided, separately and securing them to the body by pasting, riveting, etc., I make them integral with the body.

As compared with the old system, my novel method has the good feature that the projections of the body will be more firmly connected thereto, the durability is much increased and the projections may be of smaller section and yet are stronger than those that have been made separately.

My invention also relates to molds in which such bodies of clamps are made. A mold according to my invention comprises a base plate having preferably a plurality of cavities for the bodies of as many clamps, and a top plate having cavities for molding eyes, teeth, ribs, studs, and other projections of any kind, on such bodies.

I insert a core in a groove in the top plate which extends across the ends of the cavities for the eyes so that holes will be formed in such eyes while they are being molded by the cavities. I also provide means in the top plate for obtaining the required undercut section of the studs, such means comprising preferably a pair of shims abutted with their edges along the axis of the studs and provided with semicircular recesses in their abutting edges which together make up circular holes of contracted section.

In the accompanying drawings I have illustrated two forms of hair clamps, and a mold for making the first form, by way of example.

Fig. 1 is a perspective of one form,

Fig. 2 is a longitudinal section of a clamp embodying the first form,

Fig. 3 is a longitudinal section of the other form,

Fig. 4 is a section on the line IV—IV in Fig. 3, of a clamp embodying the second form, Fig. 5 is a plan view of a mold with the top plate broken partly away, Fig. 6 shows a part of the top plate, viewed from below, Fig. 7 is a section on the line VII—VII in Fig. 5, Figs. 8 and 9 are part sections on the lines VIII—VIII and IX—IX in Fig. 7, respectively, Figs. 10 and 11 are part sections on the lines X—X and XI—XI in Fig. 6, respectively.

Referring now to Figs. 1 and 2, my novel clamp comprises a body $a$, teeth or pins $b$ projecting from its inner face, an eye $c$, an undercut stud $d$, and a hasp $e$ which is inserted in the eye $c$ at one end and placed over the stud $d$ at the other end, like a spring catch. The body $a$, with the pins or projections, the eye and the stud, are molded from a single blank of celluloid or other suitable material.

The second form of clamp, Figs. 3 and 4, is similar to the one illustrated except for the fact that a solid rib $b'$ is formed on the body $a$ instead of the teeth or pins $b$.

Referring now to Figs. 5 to 11, $v$ is the base plate and $w$ is the top plate of my novel mold. It will be understood that I am not limited to any particular plate as the top plate, and the other as the base plate but the arrangement of the plates may be reversed without departing from my invention.

$z$ are dowel pins for locating the two plates with respect to each other, $x$ are a plurality of juxtaposed cavities in the base plate $v$, for molding the clamp bodies $a$, $f$ are a row of cavities in the top plate $w$ for molding the eyes $c$, and $g$ are a row of cavities in the same plate for molding the pins or teeth $b$. For a clamp as shown in Figs. 3 and 4, the cavities will be replaced by a single groove, not shown.

$l$ is a groove made in the top plate $w$ across the open ends of the cavities $f$, the edges of which groove are forged down in places so that the groove is contracted at the upper end, and $m$ is a wire having a handle $n$ and inserted in the groove $l$ from one end of the top plate $w$ so as to constitute a core for the holes in the eyes $c$.

$p$, $q$ are two shims inserted in the top plate at the point where the studs *d* will be formed on the bodies *a*, and *i* are semi-circular registering recesses in the abutting inner edges of the shims which make up circular holes together. The holes are contracted in their middle portions at *r* so that the studs molded by them will be undercut as is required for proper engagement of the hasp *e*. *s* is a pin in the top plate *w* for locating the shims *p*, *q*, and *t* is a spring latch hinged to the plate at *u* for holding the shims in position. The locating pins and the latch are preferably duplicated at the opposite end of the mold.

In operation, the core *m* and the shims *p*, *q* are inserted in the top plate *w* and a blank of celluloid or the like is placed on the cavities *x*, *x* in the base plate. The plates are then united, the mold is heated and pressure is exerted on it by suitable means, not shown. The blank will then penetrate into the cavities of the mold. Upon completion of the molding operation the top plate *w* is lifted with the clamp bodies *a*, the core or wire *m* is withdrawn, the latches *t* are pulled out as shown in dot-and-dash lines in Fig. 6, and the clamp bodies are taken out, the shims *p*, *q* coming away with them and separating by gravity.

I claim:

1. A multiple mold for making hair clamp plates comprising a matrix-like base plate having a large number of cavities in juxtaposition, a patrix-like top plate provided with rows of holes in juxtaposition and also provided with a longitudinal groove extending approximately throughout the length thereof, a wire inserted in said groove from one transverse side of the top plate, and said wire forming a common core for all hair clamps to be produced simultaneously.

2. A mold in accordance with claim 1, in which the upper edges of the longitudinal groove in the top plate project inwardly in a plurality of places in order to guide the wire in its receiving groove and prevent the wire from being moved out or removed towards the inner face of the top plate.

3. A mold in accordance with claim 1, and in combination therewith of two longitudinal strips inserted in the top plate and abutting along the central line of the row of holes, and each of said strips having opposed semicircular recesses, substantially as and for the purposes set forth.

4. A mold in accordance with claim 1, and in combination therewith of two longitudinal strips inserted in the top plate and abutting along the central line of the row of holes therein, each of said strips having opposed semicircular recesses, and means for securing the longitudinal strips comprising two springs hinged to both ends of the top plate and extending over said strips.

In testimony whereof I affix my signature.

BERNHARD LAUKAMP.